4 Sheets—Sheet 1.

J. B. STONER.
Grain-Meter.

No. 228,229. Patented June 1, 1880.

Attest:
J. Henry Kaiser
J. A. Rutherford

Inventor:
John B. Stoner
By James L. Norris.
Atty.

J. B. STONER.
Grain-Meter.

No. 228,229. Patented June 1, 1880.

Attest
J. Henry Kaiser
J. A. Rutherford

Inventor
John B. Stoner
By James L. Norris
Atty.

4 Sheets—Sheet 4.

J. B. STONER.
Grain-Meter.

No. 228,229.  Patented June 1, 1880.

Attest:
J. Henry Kaiser
J. A. Rutherford

Inventor:
John B. Stoner
By James L. Norris
Atty.

UNITED STATES PATENT OFFICE.

JOHN B. STONER, OF TOLEDO, OHIO.

GRAIN-METER.

SPECIFICATION forming part of Letters Patent No. 228,229, dated June 1, 1880.

Application filed July 2, 1879.

*To all whom it may concern:*

Be it known that I, JOHN B. STONER, of Toledo, in the county of Lucas and State of Ohio, have invented certain new and useful Improvements in Automatic Weighing-Machines, of which the following is a specification.

This invention relates to an improved apparatus for weighing grain, of that class in which a rising and falling hopper provided with two compartments, into which the grain is alternately delivered, is employed for automatically shifting the valves by which the flow of the grain into said compartments and its discharge from the same is controlled by the gravity of the grain delivered to the hopper; and it has for its object to provide for automatically distributing and stroking the grain in the compartment, and to provide an adjustable counter-balance for the hopper, as more fully hereinafter specified.

To this end the invention consists, first, in the combination, with the hopper, of a chute having two branches, through which the grain is fed to said hopper, and provided with a bucket-wheel, which is rotated by the gravity of the grain, and actuates two rotary distributers or strokers located in the compartment in the upper part of the hopper through the medium of suitable mechanism, as more fully hereinafter specified; second, in the combination, with the discharge-valves mounted on a rock-shaft at the lower part of the hopper and the cut-offs for alternately opening and closing the branches of the chute to stop or permit the flow of the grain to said compartment, of mechanism operated by the lower valves to alternately shift the cut-offs and alternately admit the grain to each compartment of the hopper, as more fully hereinafter specified; and, third, in the combination, with the chute through which the grain is fed to the hoppers, of a bucket-wheel adapted to be automatically operated by the inflowing grain, and two strokers or distributers mounted upon vertical shafts and arranged to rotate in each compartment in the upper part of the hopper, with suitable connecting mechanism for transmitting motion from the shaft of the bucket-wheel to the strokers or distributers, as more fully hereinafter set forth.

Figure 1:
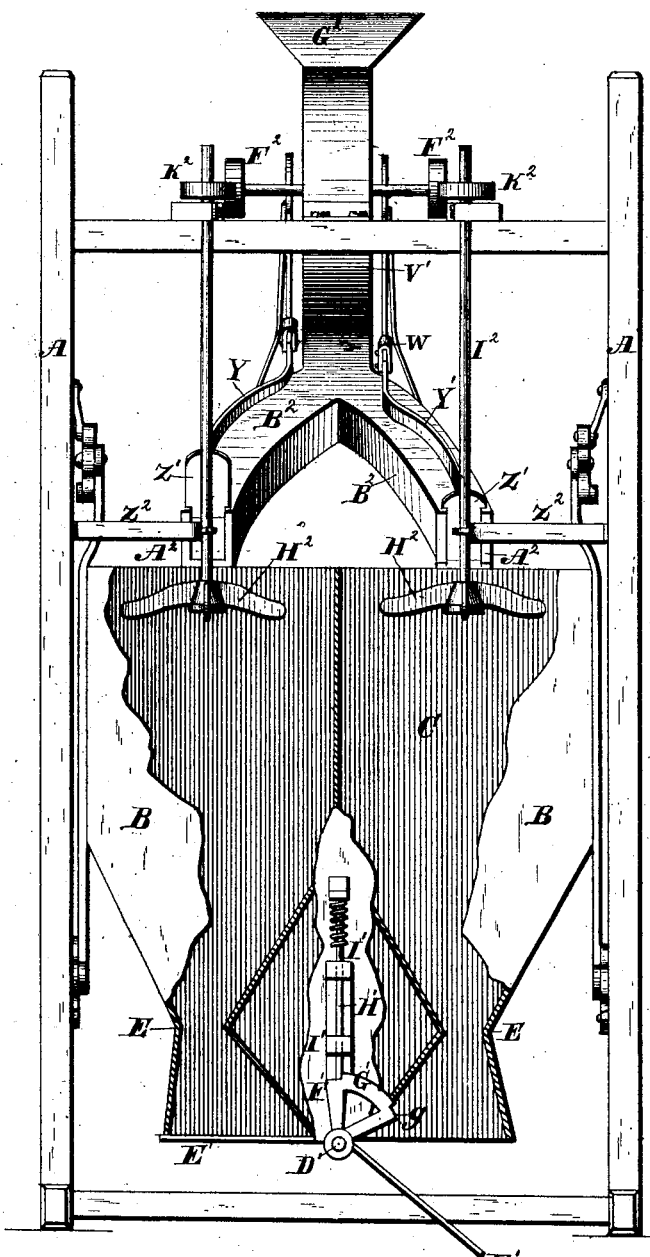
Figure 2:
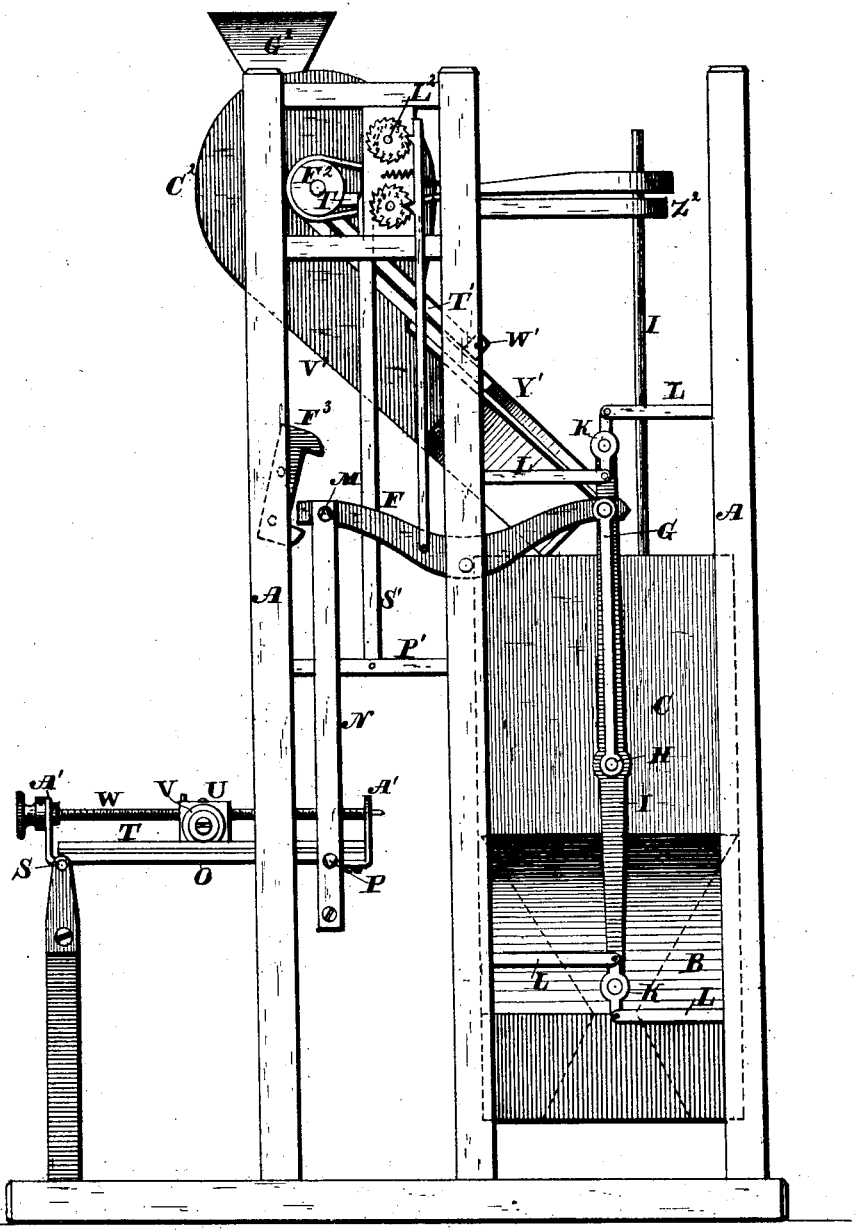
Figure 3:
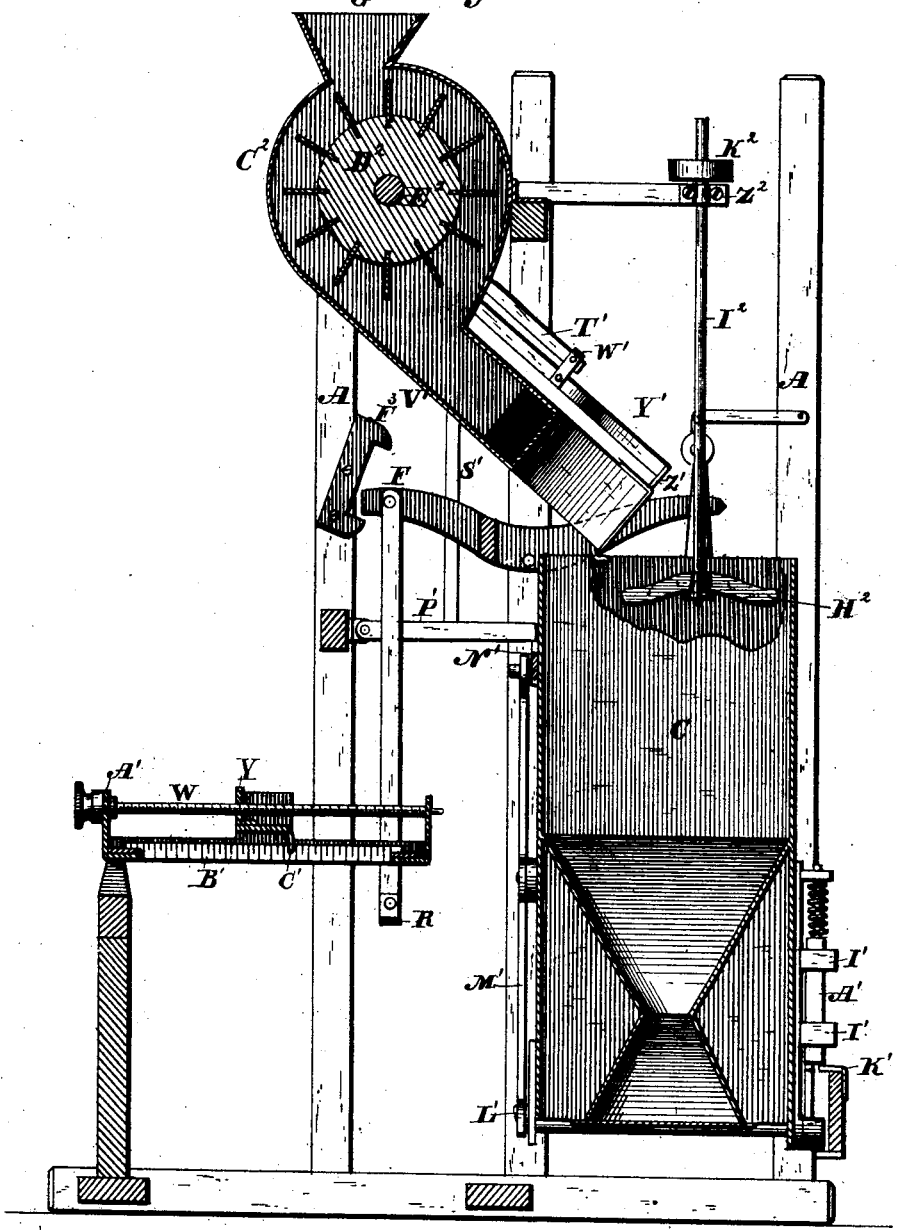
Figure 4:
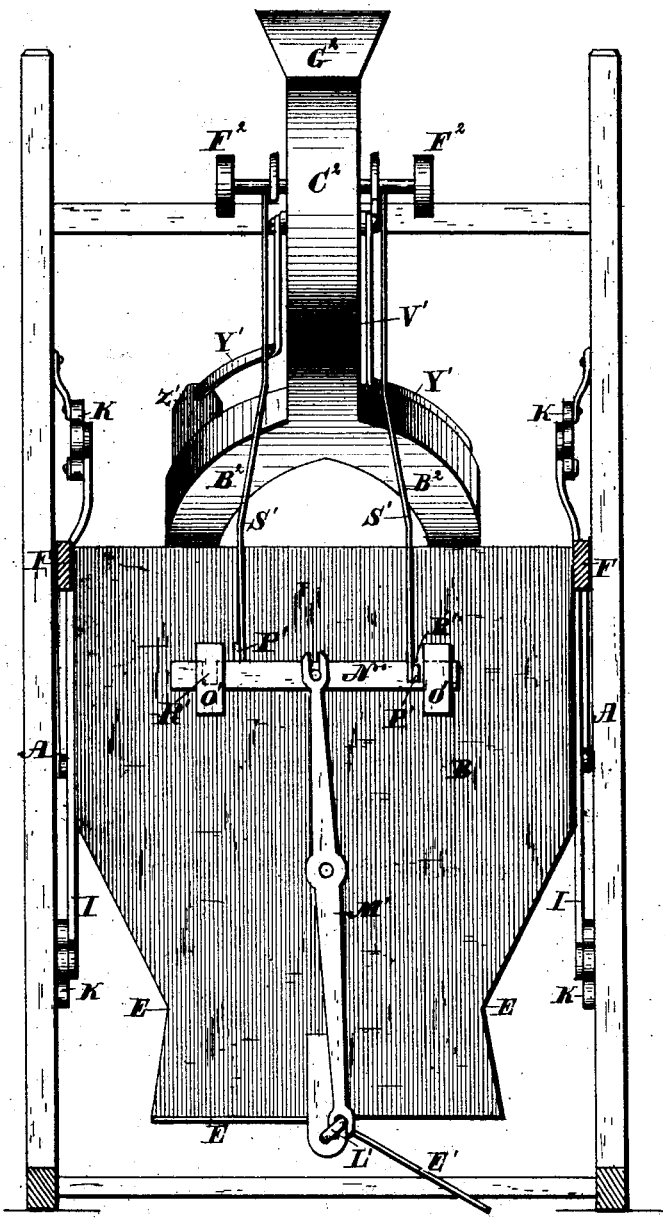

In the drawings, Figure 1 represents a front elevation of my improved apparatus with a portion of the hopper broken away, showing the internal construction of said hopper. Fig. 2 represents a side elevation of the apparatus; Fig. 3, a vertical central section; and Fig. 4 represents a rear view of the hopper, showing the mechanism for operating the upper valves, the frame and levers being partly in section.

The letter A indicates the frame supporting the various working parts of the apparatus, and B the hopper. The said hopper is formed with two compartments, C, the lower portions of which are contracted to a point, E, and from thence gradually enlarged to the bottom, the object of which is to suddenly discharge a portion of the grain when the valve at the bottom is opened, and thus allow the counter-balance to act directly, as will be more fully hereinafter explained. The hopper is mounted in a rocking or oscillating frame, F, fulcrumed within the frame A, being secured to the said rocking frame at its forward ends by means of the links G, which are attached to trunnions H, secured to opposite sides of the hopper.

To the opposite side of the hopper are also rigidly attached the uprights I, to the upper and lower ends of which are pivoted the short levers K, the ends of which are pivoted to one end of the bars L, respectively, the other ends of said bars being pivoted to the frame A, whereby the hopper is caused to rise and fall in a strictly vertical plane. The movement of the rocking frame is limited by the stops F³, secured to the frame A.

To the rear end, at each side of the rocking frame, are pivoted, on knife-edges or fulcrums M, the downwardly-extending links N, which, near their lower ends, are pivoted to the forward end of a platform, O, upon knife-edges or fulcrums P, the lower ends of said links being connected together by means of a bar, R. The rear end of the said platform is supported at opposite sides on knife-edges or fulcrums S, and is capable of an oscillating motion thereon. The upper side of said platform is provided with two parallel ways or rails, T, upon which is adapted to travel a weight, U, which is mounted on flanged wheels V.

The letter W indicates a leading-screw passing through a female-thread nut, Y, secured in a transverse slot in the weight. Said screw is journaled in standards A', attached to the platform O, so as to rotate freely and traverse the weight back and forth upon the rails or guides.

The letter B' indicates a graduated beam located in the platform below the weight, and C' an index attached to the weight, and adapted to traverse the beam and indicate the position of the weight with respect to the same in the same manner as upon an ordinary scale-beam.

The letter D' indicates a rock-shaft journaled in the hopper between the lower openings of the two compartments, and carrying the valves E', which are set at such an angle that while one is closed against the discharge-opening of one compartment the other will be open. Said rock-shaft has mounted upon its outer end a frame, F', provided with a segment, G', having shoulders $g$ at each end, with which is adapted to engage a latch, H', mounted in ways I', attached to the hopper, which is operated by a stop, K', on the frame, to alternately catch and release the shoulders $g$ and permit the valves to be alternately opened and closed by the weight of the grain in the hopper, as more fully hereinafter specified. The opposite end of the rock-shaft is provided with a short arm, L', which engages with the bifurcated lower end of a lever, M', pivoted to the hopper, its upper end being similarly bifurcated and engaging a pin on a reciprocating bar, N', mounted in ways O', secured to the hopper in such manner that said bar will be reciprocated back and forth as the rock-shaft is oscillated.

The letter P' indicates two bars pivoted to the frame A, and extending forward over the edge of the reciprocating bar N' in such position as to drop alternately into the slots R', formed in the reciprocating bar, as said bar is shifted. Said bars are connected, respectively, by the links S', with the levers T', pivoted to the chute V', and at their opposite ends connected, by means of links W', to the rods Y', which alternately operate the cut-off Z', located in ways $A^2$ at the forward ends of the branches $B^2$ of the chute V'. The said chute V' is constructed with a cylindrical chamber, $C^2$, in which is mounted a bucket-wheel, $D^2$, upon a shaft, $E^2$, projecting at each side of said chamber, and provided with pulleys $F^2$.

The letter $G^2$ indicates a hopper leading into the chamber $C^2$, through which the grain is fed into the chute V'.

The letter $H^2$ indicates two rotating strokers or distributers mounted upon the vertical shafts $I^2$, journaled in bearings in the brackets $Z^2$, attached to the frame A. The lower ends of said shafts extend into the upper parts of the compartments of the hopper, so that the strokers or distributers mounted therein will level off the grain when the compartments are filled, as more fully hereinafter specified. Upon the upper ends of the shafts are mounted the pulleys $K^2$, which are connected by endless belts to the pulleys $F^2$, by means of which a rotary motion is imparted to them as the wheel $D^2$ is rotated by the inflowing grain.

The letter $L^2$ indicates an indicator connected by a link with the weighted platform, which serves to indicate the amount of grain that has passed through the apparatus.

The operation of my invention is as follows: The grain being allowed to flow into the chute rotates the bucket-wheel, imparting motion thereto, and, through the medium of the belts and pulleys, to the rotary distributers or strokers. The parts being in position shown in Fig. 1, the upper left-hand cut-off being open and the lower left-hand valve closed, the grain will flow into the left-hand compartment of the hopper until it is filled. The weight of the grain will then overbalance the weighted platform, depressing the hopper, which causes the latch in front to abut against its stop and release the segment on the rock-shaft, when the weight of the grain in the hopper will throw down the lower left-hand valve, discharging the grain from said left-hand compartment. The opening of the lower left-hand valve will close the lower right-hand valve and open the upper right-hand cut-off, when the grain will flow into the right-hand compartment and continue until it is full, when the hopper will be again depressed, (having been elevated by the counter-balance when relieved of the weight of the grain,) when the parts will be shifted to their original position, and the operation will thus continue so long as the grain continues to flow.

What I claim is—

1. In an apparatus for weighing grain, in combination with the hopper and the chute for supplying the same with grain, a bucket-wheel mounted upon a shaft, and two strokers or distributers, with suitable mechanism for transmitting motion from the bucket-wheel to the same, whereby they will be automatically operated by the inflowing grain, substantially as specified.

2. In combination with the discharge-valves mounted upon a rock-shaft at the lowest part of the hopper, a lever operated by said rock-shaft and a reciprocating bar operated by said lever, said bar being slotted near each end, into which slots two pivoted bars are adapted to alternately drop, said bars being connected to the levers for actuating the cut-offs of the chute for alternately supplying each compartment of the hopper, substantially as specified.

3. In combination with the rising and falling hopper, the platform fulcrumed at one end to the frame of the apparatus and at the other to links fulcrumed to the rocking frame which supports the hopper, said platform being provided with ways or rails, upon which is adapted to travel a weight mounted on wheels and provided with a leading-screw, by means of which it may be shifted in order to adjust the weight, substantially as and for the purpose specified.

4. In combination with the rising and falling hopper, a platform suitably fulcrumed to the frame of the apparatus and connected to the rocking frame which supports the hopper, said platform being provided with a movable weight, which may be adjusted as required, substantially as specified.

In testimony that I claim the foregoing I have hereunto set my hand in the presence of the subscribing witnesses.

JOHN B. STONER.

Witnesses:
 JAMES L. NORRIS,
 JAS. A. RUTHERFORD.